Oct. 25, 1960
JEAN-PAUL MULLER
2,957,639
BRAKE SYSTEM FOR SPOOLS OF STRIPS
OF PLASTIC MATERIAL
Filed Oct. 11, 1957
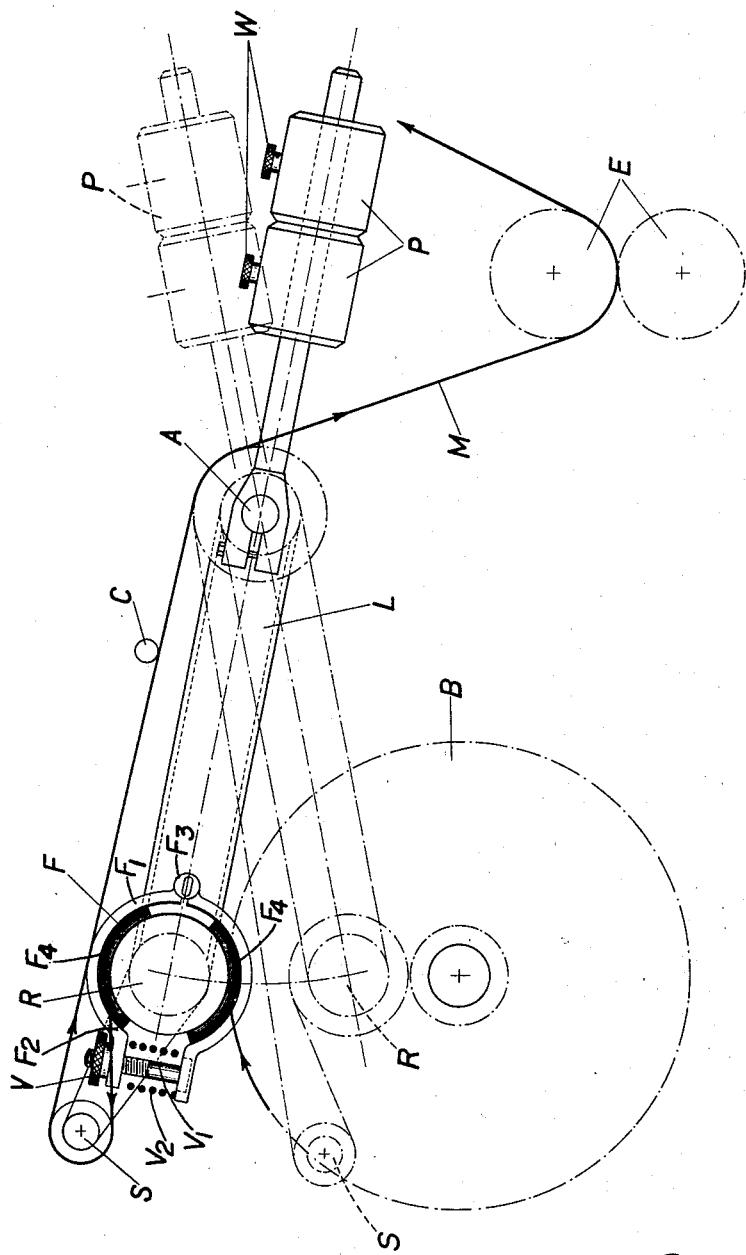
JEAN-PAUL MULLER
                INVENTOR.
BY

United States Patent Office

2,957,639
Patented Oct. 25, 1960

2,957,639

BRAKE SYSTEM FOR SPOOLS OF STRIPS OF PLASTIC MATERIAL

Jean-Paul Muller, Strasbourg-Robertsau, France, assignor to Société à responsabilité limitée les Ateliers de Constructions Mecaniques C. & A. Holweg, Strasbourg, France Filed Oct. 11, 1957, Ser. No. 689,656

Claims priority, application France Oct. 12, 1956

4 Claims. (Cl. 242—75.2)

The present invention relates to a brake system for spools of strips of plastic material.

It is one object of the present invention to provide a brake for spools of strips of plastic material such as polyethylene, said brake being adapted to reduce their speed of unwinding wherein the spools comprise the material and the carrier thereof.

Conventional brakes for machines transforming paper strips or strips of plastic material are generally applied directly to the unwinding shaft. Now, if this braking which is almost always of a frictional type is not controlled by a special mechanism, which is generally costly, it is apparent that the tensioning applied to the strip upon unwinding increases as the diameter of the spool decreases. If no automatic adjusting member is provided for the braking system, the operator is constrained to release periodically the brake in an attempt to obtaining a substantially constant tensioning of the strip.

The maintenance of a practically constant tensioning of the strip during its unwinding is an essential requirement in the case of certain materials which are extremely elastic, such as polyethylene for instance. As a matter of fact, if this maintenance of the tensioning is not obtained, it is impossible to provide in the transformation machine a correct registering, i.e. an accurate juxtaposition of the different colors or a correct position of the line of weld with reference to the printed matter when the strips are intended for the production of bags.

Furthermore, the braking should be an extremely smooth and gentle one, so as to eliminate the risk of an exaggerated extension of the strip. As a matter of fact, the materials considered have a generally reduced thickness of the order of $2/100$ to $4/100$ of a mm. and which in fact may not be uniform. Consequently, if extensions are produced through the application of an exaggerated tensioning, these extensions are extremely irregular and depend on the thickness of the strips.

Even if a very skillful operator is capable of opening an axial brake in a perfectly smooth manner, he could not prevent a stepwise modification in the tensioning and his attention should therefore be applied solely to the actual braking.

It is another object of the present invention to remove this drawback through the provision of a brake which may be adjusted in a highly accurate and sensitive manner, so as to ensure a practically constant tensioning of the strip, which is being unwound without requiring any control by the operator of the transforming machine.

It is yet another object of the present invention to provide a brake which includes a roller carried at the end of an arm adapted to rock about a stationary pivot and resting permanently under adjustable pressure conditions on the spool to be unwound; said roller is provided at one end with an adjustable friction system adapted to transmit a braking action to the periphery of the spool, while the strip which is being unwound and is drawn out by the driving rollers forming part of the transformation machine surrounds said roller over at least one half circumference as a consequence of its passing over an auxiliary roller carried by the end of the arm beyond the first-mentioned roller, whereby said braking action remains uniform as long as the speed of progression of the strip remains constant.

With these and other objects in view, which will become apparent in the following detailed description, the present invention will be clearly understood in connection with the accompanying drawing, wherein the single figure is a diagrammatic side view of the brake.

Referring now to the drawing, to a stationary pivot A, formed on the frame of the strip transformation or working machine, is fitted a rocking arm L, the angular shifting of which in an upward direction is limited by a stop C.

To the arm L is secured a roller R near its outer end and the terminal section of the roller R is fitted with a friction brake system F, the adjustment of which is provided by a screw with a knurled head V. The brake system F comprises, as shown in the drawing, a pair of arcuate clamping members $F_1$ pivotally connected and having offset end portions $F_2$ opposite the pivotal connection $F_3$, brake shoes $F_4$ being provided interiorly of the clamping members $F_1$. A screw $V_1$ extends through suitable apertures in the offset ends and is surrounded by a coil spring $V_2$ between the ends, adjustment of the coil compression spring $V_2$ being controlled by the knurled head V threaded onto the end of the screw $V_1$. An extension of the opposite end of the arm L carries two sliding counterweights P secured adjustably to said extension by securing screws W.

A small roller S is fitted on a support forming an outer extension in the opposite direction of the arm L. The strip M of plastic material, such as polyethylene, unwinding from the spool B subjected to the action of the driving roller system E of the transformation machine surrounds the braked roller R over at least one half circumference and then passes over the rear roller S towards the driving rollers E. The braked roller R is always in engagement with the spool B, so that the strip M of plastic material is easily fed from the spool B to the braked roller R.

The braking action of the roller R is thus transmitted to the periphery of the spool, while the unwinding of the strip exerts a pressure which is defined by the adjustable position of the counterweights.

This braking action remains constant as long as the speed of passage of the strip M is also constant.

This manner of braking does not require any actual control by the operator, since the friction means F are adjusted once and for all according to the nature of the material forming the strip to be unwound.

It should be remarked furthermore that the operation is perfectly satisfactory even if the master spool B that is being unwound is not of a perfectly uniform structure.

While I have disclosed one embodiment of the present invention, it is to be understood that this embodiment is given by example only and not in a limiting sense, the scope of the present invention being determined by the objects and the claims.

I claim:

1. An unwinding system for a spool of a strip of plastic material comprising driving rollers, an arm pivotally secured to a stationary point extending over the spool to rock about an axis parallel with that of said spool, a roller revolubly carried by said arm near one end thereof and engaged over at least one half of its circumfrence by the strip as it winds off the spool towards said driving rollers, adjustable means comprising arcuate pivotally connected clamping members surrounding said last mentioned roller for frictionally braking the rotation of said roller, adjustable spring means governing the braking effect of said clamping members, and said roller engaging said spool, 2. An unwinding system for a spool of a strip of plastic material comprising driving rollers, an arm pivotally secured to a stationary point extending over the spool to rock about an axis parallel with that of said spool, a roller revolubly carried by said arm near one end thereof and engaged over at least one half of its circumference by the strip as it winds off the spool towards said driving rollers, adjustable means frictionally braking the rotation of said roller, an auxiliary roller revolubly carried by said rocking arm at a point beyond the strip engaged roller with reference to the pivotal axis of the arm and engaged by the strip at a point of its path beyond said first-mentioned strip engaged roller, and the latter engaging said spool.

3. An unwinding system for a spool of a strip of plastic material comprising driving rollers, an arm pivotally secured to a stationary point extending over the spool to rock about an axis parallel with that of the spool, a roller revolubly carried by said arm near one end thereof engaged over at least one half of its circumference by the strip as it winds off the spool towards the driving rollers, adjustable means frictionally braking the rotation of the roller, an auxiliary roller revolubly carried by the rocking arm at a point beyond the strip engaged roller with reference to the pivotal axis of the arm engaged by the strip at a point of its path beyond said first-mentioned strip engaged roller, a counterweight slidingly fitted on the arm on a part thereof lying beyond its pivotal axis with reference to the strip engaged roller serving to bias said arm away from said strip engaged roller, means for adjustably securing said counterweight to a selected point of the arm, and said strip engaged roller engaging said spool.

4. An unwinding system for a spool of a strip of plastic material comprising driving rollers, an arm pivotally secured to a stationary point extending over the spool to rock about an axis parallel with that of the spool, a stop limiting the rocking of the arm away from the spool, a roller revolubly carried by said arm near one end thereof engaged over at least one half of its circumference by the strip as it winds off the spool towards the driving rollers, adjustable means frictionally braking the rotation of the roller and an auxiliary roller revolubly carried by the rocking arm at a point beyond the strip engaged roller with reference to the pivotal axis of the arm engaged by the strip at a point of its path beyond said first-mentioned strip engaged roller, a counterweight slidingly fitted on said arm on the part thereof lying beyond its pivotal axis with reference to the strip engaged roller, serving to bias said arm in a direction away from said strip engaged roller, and the latter engaging said spool.

References Cited in the file of this patent

UNITED STATES PATENTS

| | | |
|---|---|---|
| 196,296 | Haworth | Oct. 23, 1877 |
| 225,557 | Brown | Mar. 16, 1880 |
| 363,024 | Waldron | May 17, 1887 |
| 1,256,503 | Lewis | Feb. 12, 1918 |
| 1,807,274 | Beidler | May 26, 1931 |